(12) United States Patent
Zhu

(10) Patent No.: US 10,584,707 B2
(45) Date of Patent: Mar. 10, 2020

(54) VERTICAL TOWER FAN AND METHOD FOR QUICKLY ASSEMBLING AND DISASSEMBLING THE SAME

(71) Applicant: Shou Qiang Zhu, Ontario, CA (US)

(72) Inventor: Shou Qiang Zhu, Ontario, CA (US)

(73) Assignee: IP Power Holdings Limited, Hong Kong (HK)

( * ) Notice: Subject to any disclaimer, the term of this patent is extended or adjusted under 35 U.S.C. 154(b) by 695 days.

(21) Appl. No.: 15/221,536

(22) Filed: Jul. 27, 2016

(65) Prior Publication Data

US 2017/0030362 A1 Feb. 2, 2017

Related U.S. Application Data

(60) Provisional application No. 62/197,500, filed on Jul. 27, 2015.

(51) Int. Cl.
*F04D 25/10* (2006.01)
*F04D 27/00* (2006.01)

(52) U.S. Cl.
CPC ......... *F04D 25/105* (2013.01); *F04D 27/004* (2013.01)

(58) Field of Classification Search
CPC .. F16B 2/00; F16B 5/00; F04D 25/105; F04D 17/04; F04D 27/004
See application file for complete search history.

(56) References Cited

U.S. PATENT DOCUMENTS

2005/0123391 A1\* 6/2005 Lim ....................... F04D 17/04
415/14

\* cited by examiner

*Primary Examiner* — Moshe Wilensky
(74) *Attorney, Agent, or Firm* — Che-Yang Chen; Law Offices of Scott Warmuth

(57) ABSTRACT

A vertical tower fan may include a control unit, a fan unit having a shaft, a shell assembly and a main body. A securing unit supporting by a number of resilient units is disposed underneath the control unit. When the user wants to remove the fan unit from the fan, he/she can simply lift the securing unit, and the top portion of the shaft can be separated from the securing unit. Meanwhile, the bottom portion of the shaft can be removed from a protrusion, so the entire fan unit can be separated from the fan for cleaning or repairing without using any tools.

2 Claims, 5 Drawing Sheets

VERTICAL TOWER FAN AND METHOD FOR QUICKLY ASSEMBLING AND DISASSEMBLING THE SAME

CROSS-REFERENCE TO RELATED APPLICATIONS

This application claims priority under 35 U.S.C. § 119 (e) to U.S. Provisional Patent Application Ser. No. 62/197,500, filed on Jul. 27, 2015, the entire contents of which are hereby incorporated by reference.

FIELD OF THE INVENTION

The present invention relates to a vertical tower fan, and more particularly to a vertical tower fan that can be easily assembled and disassembled.

BACKGROUND OF THE INVENTION

Current vertical tower fan generally comprises a fan unit and a motor. The fan unit having a blower housing with a blower rotates relative to a fan base. The blower inside the blower housing may include a plurality of blades at different elevations to generate the cooling effect, and a vertical shaft is engaged with the blower housing. The motor may be disposed on at least one end of the vertical shaft to rotate the fan unit.

However, the conventional vertical tower fan is difficult to be cleaned or repaired because there are too many components in the conventional vertical tower fan as shown in FIG. 1, and tools are usually needed to disassemble it when the user wants to clean the fan. Therefore, there remains a need for a new and improved design for a vertical tower fan to overcome the problems stated above.

SUMMARY OF THE INVENTION

It is an object of the present invention to provide a vertical tower fan that can be easily cleaned or repaired.

It is another object of the present invention to provide a vertical tower fan that can be easily assembled and disassembled because the fan unit of the vertical tower fan can be easily removed therefrom without using a tool.

In one aspect, the present invention provides a vertical tower fan, which comprises a control unit, a fan unit, a shell assembly that includes a front cover and rear cover, and a main body. In one embodiment, the front cover and rear cover can be disposed on a front surface and rear surface of the fan in a "snap-in" manner, so they are easily to be put on the fan and removed therefrom.

The control unit has a control panel located on an upper portion of the vertical tower fan in order to control the speed or rotation of the fan unit. In one embodiment, a top portion of the fan unit is engaged with a securing unit disposed underneath the control unit. More specifically, a receiving hole is formed on a central portion of the securing unit to receive a top portion of a shaft of the fan unit.

In one embodiment, the securing unit is supported by one or more resilient units, so the securing unit is configured to move vertically from one position to another position within a predetermined distance underneath the control unit, and the top portion of the shaft can be inserted into the receiving hole when the securing unit is vertically lifted up. In another embodiment, the control unit may comprise a sensor for receiving control signals from a remote control.

The fan unit comprises a blower that has a plurality of blades at different elevation for achieving the cooling effect, and the shaft. The fan unit is received in a receiving space of the main body, and in one embodiment, the shaft may vertically penetrates through nearly a central portion of the blower. In another embodiment, the shaft can be just formed on a central portion on top of the blower, and can be received in the receiving hole of the securing unit to secure the top portion of the fan unit.

In a further embodiment, a lower end fan unit has an fan receiving hole to receive a protrusion at a bottom portion of the receiving space, so the fan unit can be secured in the receiving space when the top portion thereof is being secured by the securing unit and the bottom portion thereof is engaged with the protrusion. It is noted that the protrusion can be connected to a motor, and the fan unit can be driven indirectly by the motor through the protrusion.

Comparing with conventional vertical tower fan, the present invention is advantageous because the vertical fan can be easily assembled and disassembled. More specifically, the fan unit can be easily removed from the receiving space of vertical tower fan without any tools, so the fan unit can be easily cleaned, repaired or replaced.

DETAILED DESCRIPTION OF THE INVENTION

Figure 1:
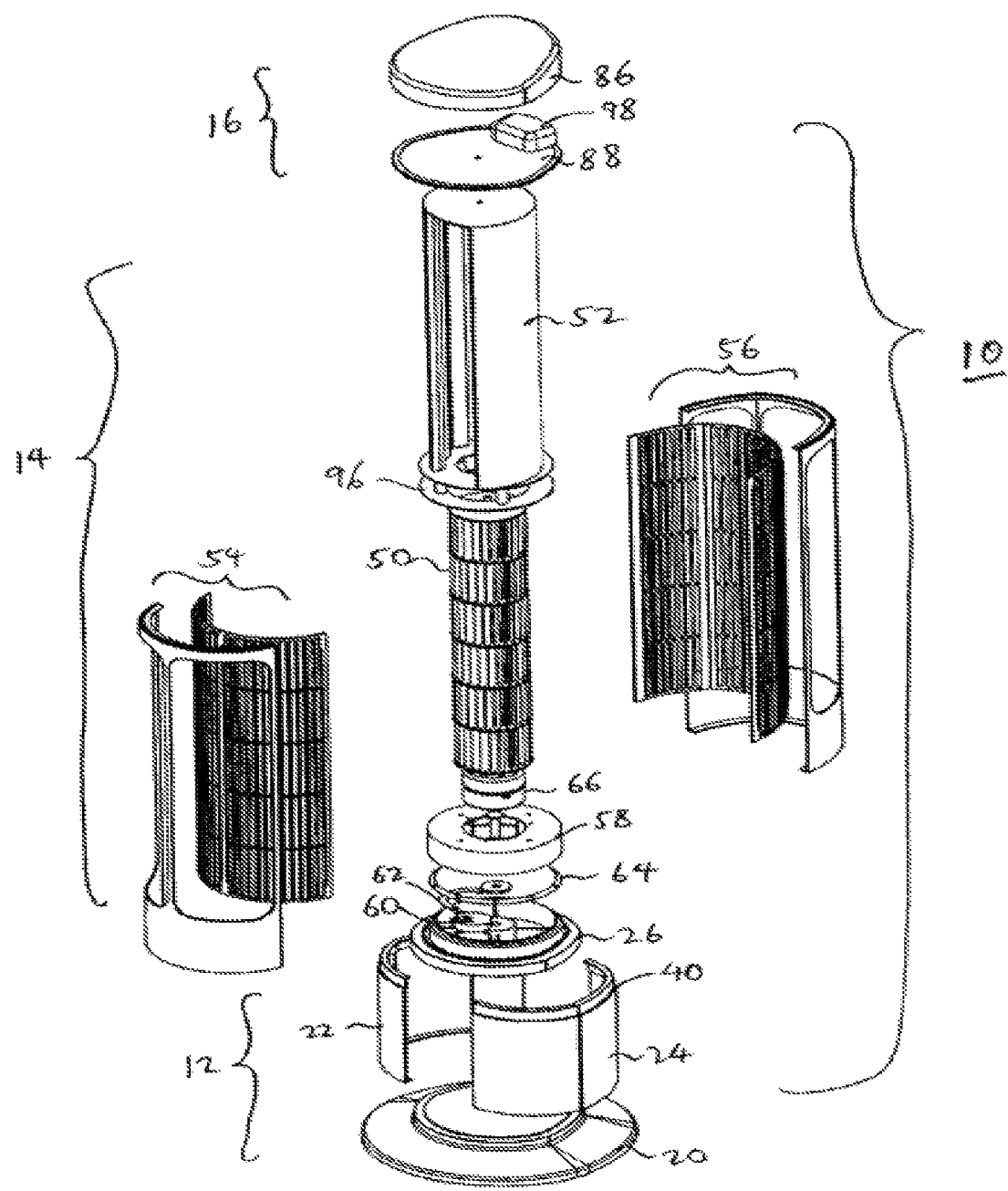
FIG. 1 is a prior art of a vertical tower fan.
Figure 2:
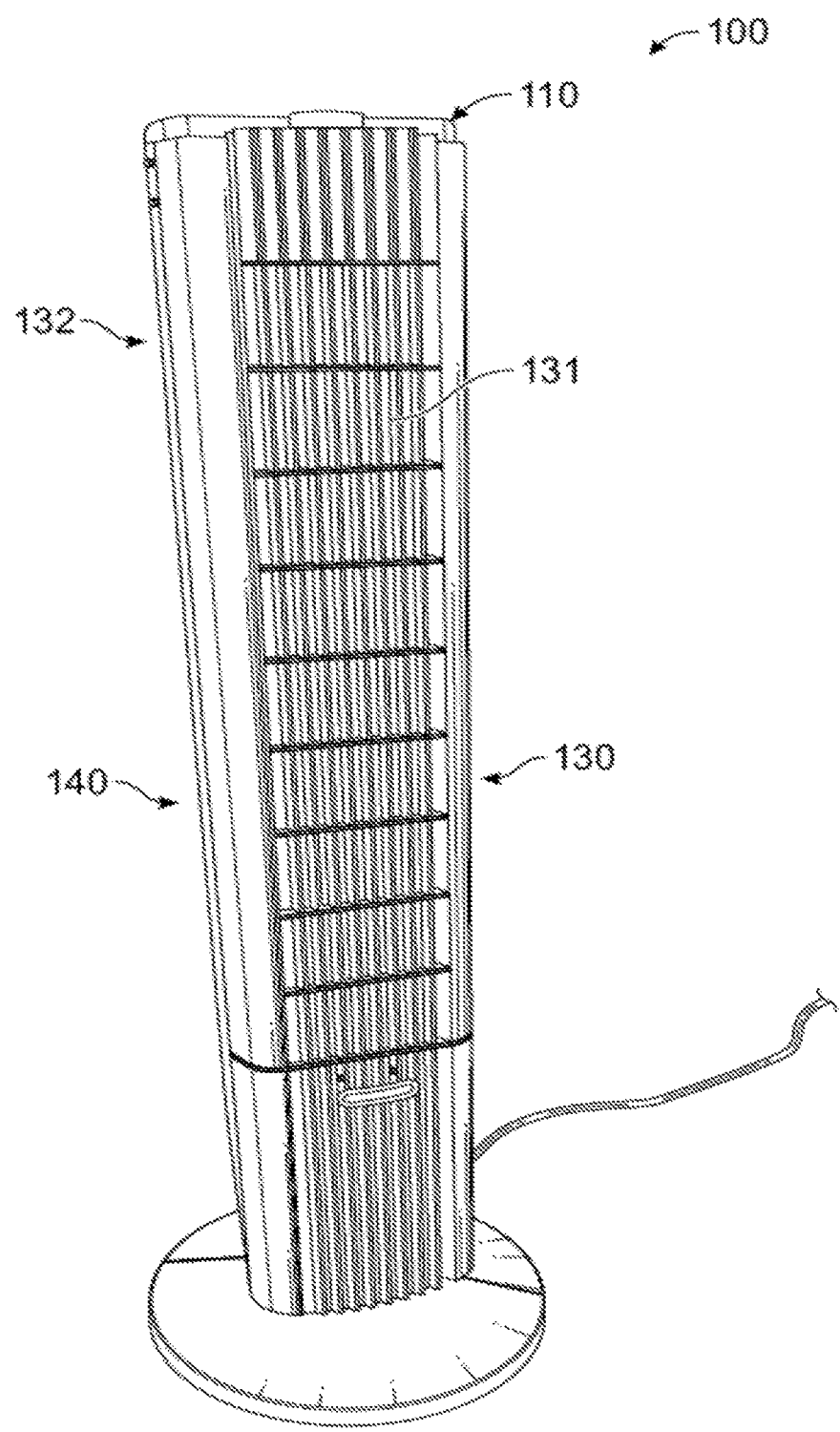
FIG. 2 is a schematic view of the vertical tower fan in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 2 to 5, the present invention provides a vertical tower fan (100), which comprises a control unit (110), a fan unit (120), a shell assembly (130) that includes a front cover (131) and rear cover (132), and a main body (140). In one embodiment, the front cover (131) and rear cover (132) can be disposed on a front surface and rear surface of the fan (100) in a "snap-in" manner, so they are easily to be put on the fan (100) and removed therefrom.

The control unit (110) has a control panel (111) located on an upper portion of the vertical tower fan (100) in order to control the speed or rotation of the fan unit (120). In one embodiment, a top portion of the fan unit (120) is engaged with a securing unit (112) disposed underneath the control unit (110). More specifically, a receiving hole (1121) is formed on a central portion of the securing unit (112) to receive a top portion of a shaft (124) of the fan unit (120).

In one embodiment, the securing unit (112) is supported by one or more resilient units (114), so the securing unit (112) is configured to move vertically from one position to another position within a predetermined distance underneath the control unit (110), and the top portion of the shaft (124) can be inserted into the receiving hole (1121) when the securing unit (112) is vertically lifted up. In another embodiment, the control unit (110) may comprise a sensor for receiving control signals from a remote control.

The fan unit (120) comprises a blower (121) that has a plurality of blades (123) at different elevation for achieving the cooling effect, and the shaft (124). The fan unit (120) is received in a receiving space (141) of the main body (140), and in one embodiment, the shaft (124) may vertically penetrates through nearly a central portion of the blower (121). In another embodiment, the shaft (124) can be just extending on a central portion on top of the blower (121), and can be received in the receiving hole (1121) of the securing unit (112) to secure the top portion of the fan unit (120).

In a further embodiment, a lower end fan unit (120) has an fan receiving hole (125) to receive a protrusion (142) at a bottom portion of the receiving space (141), so the fan unit (120) can be secured in the receiving space (141) when the top portion thereof is being secured by the securing unit (112) and the bottom portion thereof is engaged with the protrusion (142). It is noted that the protrusion (142) can be connected to a motor (150), and the fan unit (120) can be driven indirectly by the motor (150) through the protrusion (142).

Figure 3:
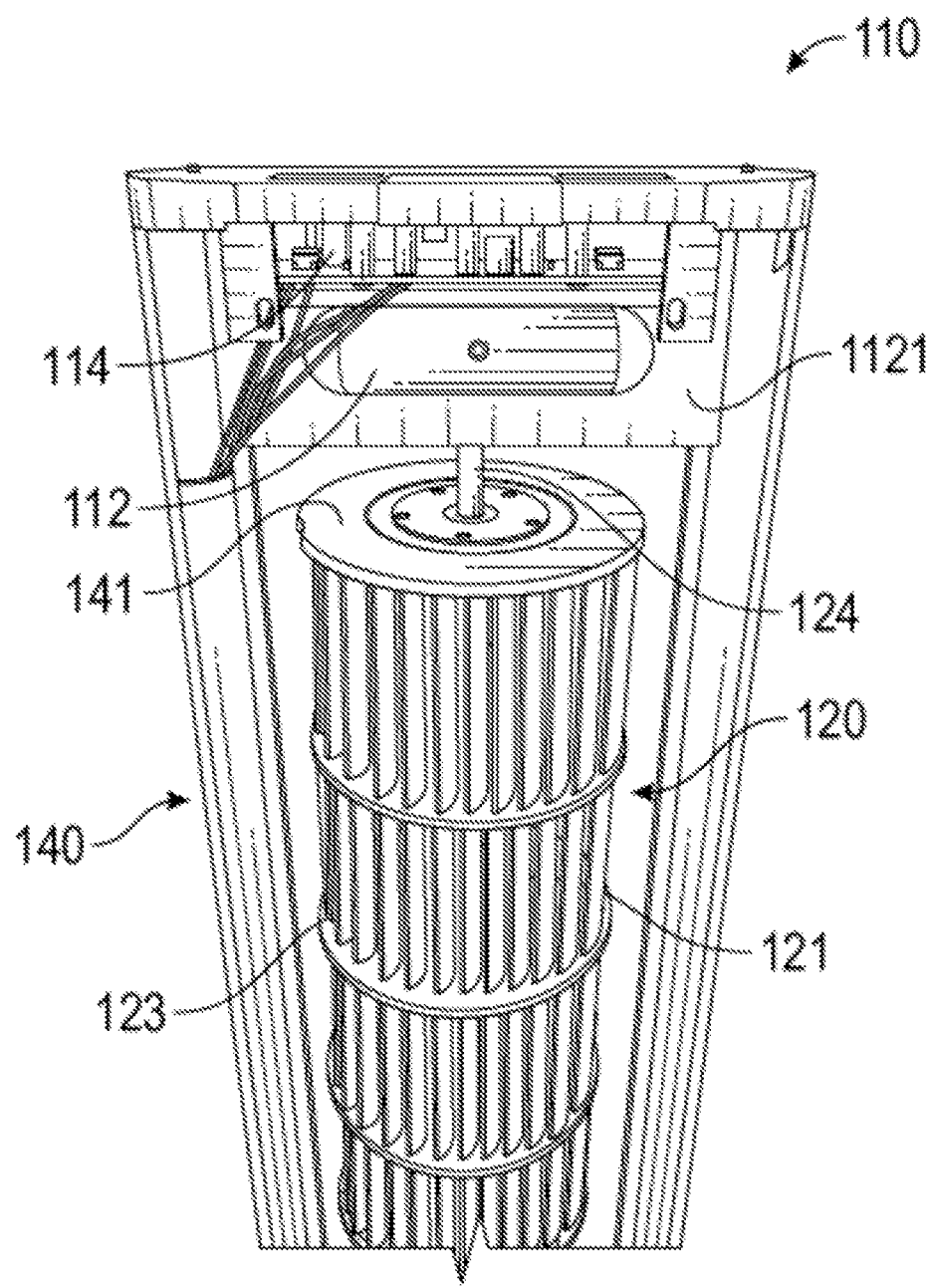
FIG. 3 is a partial enlarged view of the securing unit and fan unit of the vertical tower fan in the present invention.
Figure 4:
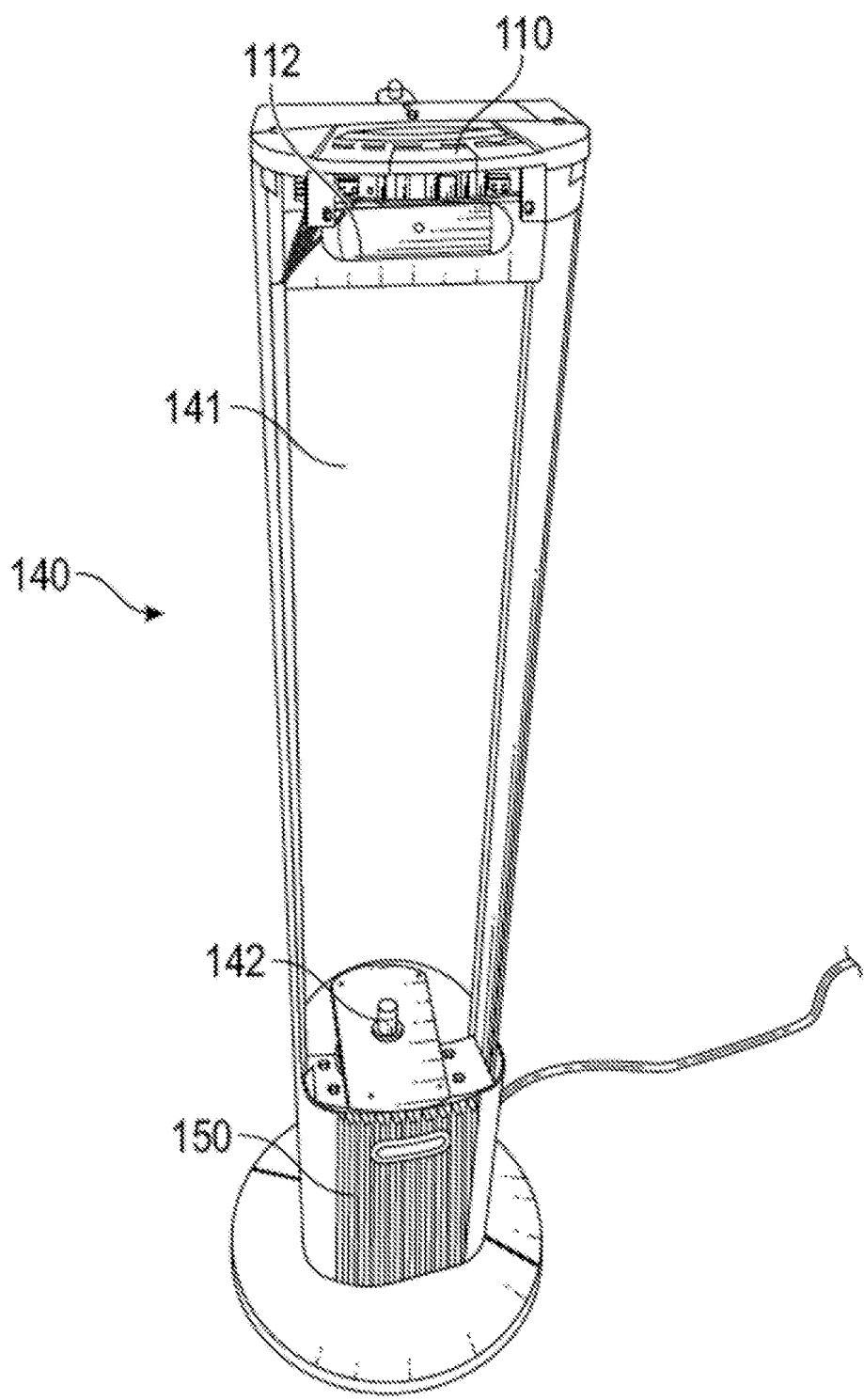
FIG. 4 shows the main body of the vertical tower fan in the present invention.
Figure 5:
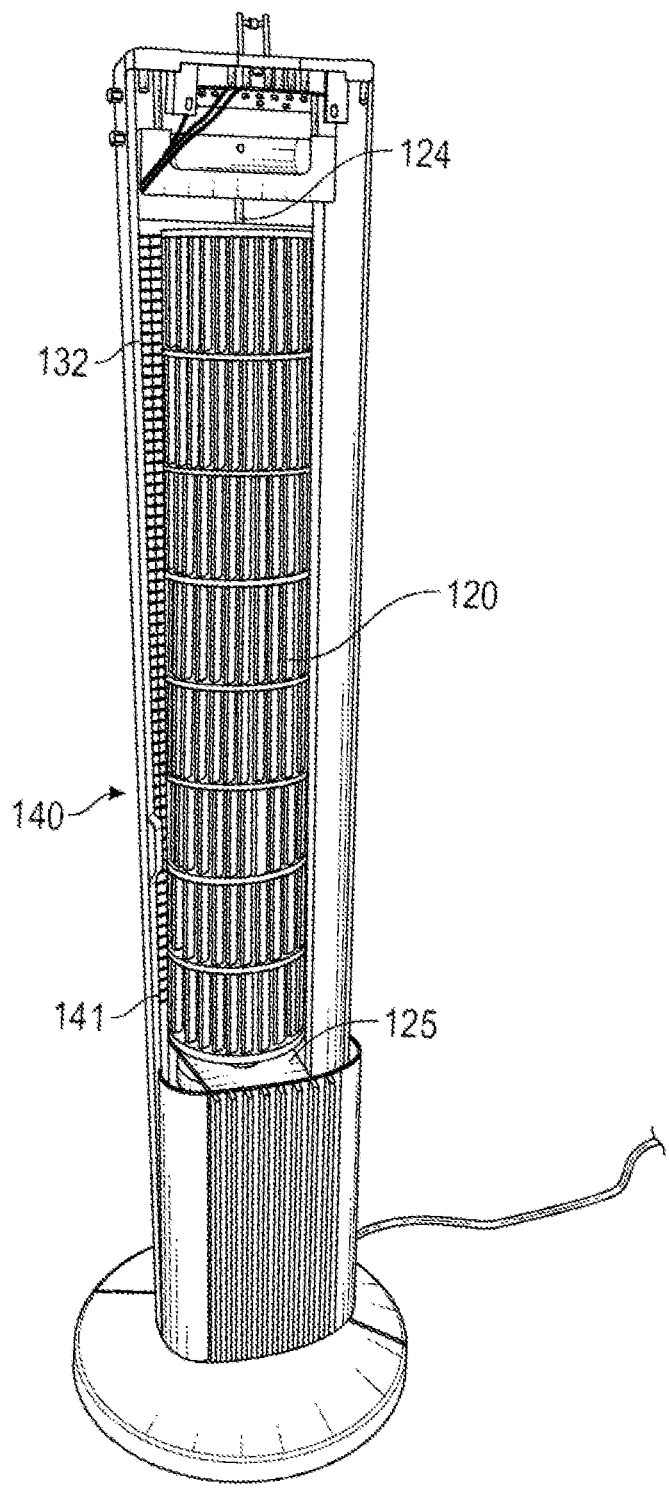
FIG. 5 is a partial exploded view of the main body and fan unit of the vertical tower fan in the present invention.

When the user wants to remove the fan unit (120) from the fan, he/she can simply remove the front (131) and rear (132) covers from the vertical fan (100), and lift the securing unit (112) as shown in FIG. 3, and the top portion of the shaft (124) can be separated from the securing unit (112). Meanwhile, the bottom portion of the shaft (124) can be removed from the protrusion (142), so the entire fan unit (120) can be separated from the fan (100) without using any tools, and the fan unit (120) can be cleaned and then put back.

To put the fan unit (120) back, the user can simply reverse the removal process by disposing the bottom end of the fan unit (120) onto the protrusion (142), lifting up the securing unit (112), inserting the fan unit (120) into the receiving space (141), inserting the shaft (124) into the receiving hole (1121) of the securing unit (112), releasing the securing unit (112), and putting the front cover (131) and rear cover (132) back to the main body (140).

Comparing with conventional vertical tower fan, the present invention is advantageous because the vertical fan (100) can be easily assembled and disassembled. As discussed above, the fan unit (120) can be easily removed from the receiving space (141) of vertical tower fan (100) without any tools, so the fan unit (120) can be easily cleaned, repaired or replaced.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A method for assembling a vertical tower fan comprising steps of:
    providing a main body of the tower fan that has a receiving space for a fan unit that has a shaft extending from a top portion thereof;
    inserting the fan unit into the receiving space; and
    putting a front cover and a rear cover to the main body of the tower fan in a "snap-in" manner,
    wherein a securing unit is disposed at a top portion of the receiving space to secure a top portion of the fan unit, and a fan receiving hole is formed at a bottom portion of the fan unit to receive a protrusion at a bottom portion of the receiving space, so the fan unit is secured on both the top and bottom portions in the receiving space,
    wherein the securing unit is supported by one or more resilient units, so the securing unit is configured to move vertically from one position to another position within a predetermined distance underneath the control unit, and the top portion of the shaft is secured in the receiving space by inserting the shaft into a receiving hole of the securing unit when the securing unit is vertically lifted up.

2. The method for assembling a vertical tower fan of claim 1, wherein the vertical tower fan is quickly disassembled by removing the front and rear covers from the vertical fan; lifting the securing unit to release the top portion of the shaft from the securing unit; and removing the bottom portion of the shaft from the protrusion.

* * * * *